(12) United States Patent
Kajitani (10) Patent No.: US 7,036,790 B2
(45) Date of Patent: May 2, 2006

(54) VACUUM PRESSURE REGULATING VALVE

(75) Inventor: Masao Kajitani, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 58 days.

(21) Appl. No.: 10/810,714

(22) Filed: Mar. 29, 2004

(65) Prior Publication Data

US 2004/0232369 A1 Nov. 25, 2004

(30) Foreign Application Priority Data

May 19, 2003 (JP) .............................. 2003-140858

(51) Int. Cl.
*F16K 51/02* (2006.01)
(52) U.S. Cl. ...................................................... 251/122
(58) Field of Classification Search ......... 251/120–122
See application file for complete search history.

(56) References Cited

U.S. PATENT DOCUMENTS

| | | | | |
|---|---|---|---|---|
| 3,857,545 A | * | 12/1974 | Santi | 251/229 |
| 4,416,416 A | * | 11/1983 | Maltby | 236/86 |
| 6,494,229 B1 | * | 12/2002 | Kajitani | 137/530 |
| 2002/0033462 A1 | * | 3/2002 | Kajitani | 251/63.6 |

* cited by examiner

*Primary Examiner*—J. Casimer Jacyna
(74) *Attorney, Agent, or Firm*—Oblon, Spivak, McClelland, Maier & Neustadt, P.C.

(57) ABSTRACT

An annular valve seat is formed in a connecting path connecting a first main port and a second main port, a circular flow path wall having a diameter greater than a seat diameter is formed around the valve seat so as to surround the valve seat, a circular outer peripheral wall having a diameter greater than the seat diameter and smaller than a diameter of the flow path wall is formed at a disc-shaped valve member, and a restricted flow path is formed between the flow path wall and the outer peripheral wall when the valve member is fitted in the flow path wall.

15 Claims, 9 Drawing Sheets

PRIOR ART

VACUUM PRESSURE REGULATING VALVE

TECHNICAL FIELD

The present invention relates to a vacuum pressure regulating valve used for reducing pressure in a vacuum chamber for chemical reaction in physical and chemical machines.

BACKGROUND ART

Figure 17:
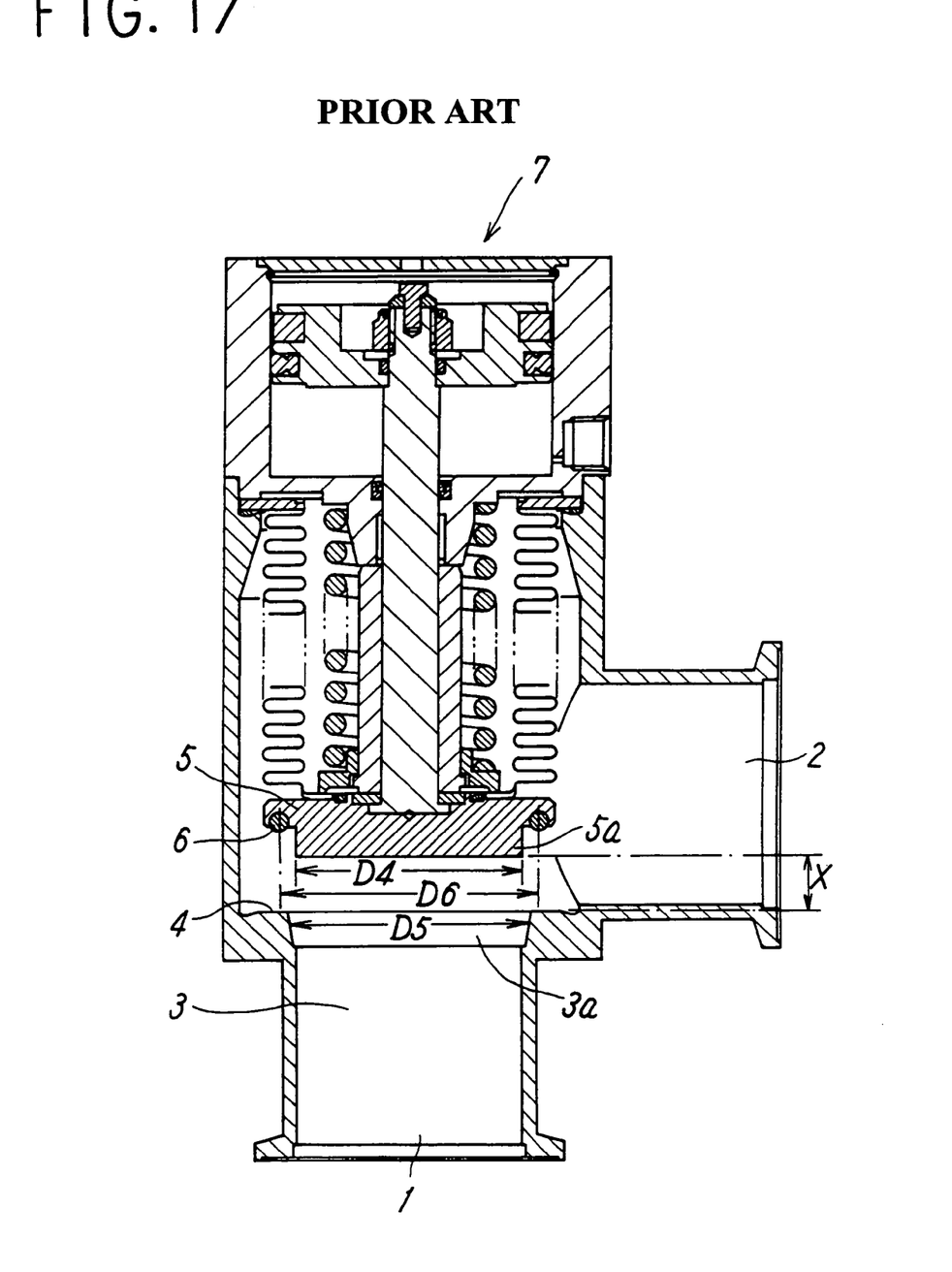
FIG. 17 is a sectional view of a prior-art valve.

In a producing apparatus of a semiconductor, for example, a chemical treatment such as etching is carried out in a vacuum chamber. At this time, a vacuum pump is used for reducing pressure in the vacuum chamber and a pressure regulating valve is used for controlling the vacuum pump. FIG. 17 shows a known vacuum pressure regulating valve. This valve includes a first main port 1 and a second main port 2 connected to a vacuum pump and a vacuum chamber, a valve seat 4 formed around a port hole 3 of the first main port 1, a disc-shaped valve member 5 having an annular sealing member 6 for opening and closing the valve seat 4 on a front face of the member 5, and an air cylinder mechanism 7 for causing the valve member 5 to carry out opening and closing operations.

A regulating shaft portion 5a in the shape of a cylindrical column is formed inside the annular sealing member 6 on the front face of the valve member 5 and a regulating hole portion 3a of such a size that the regulating shaft portion 5a can be fitted in the portion 3a with a clearance between them is formed at an end portion of the port hole 3. A throttle-like member is formed by fitting of the regulating shaft portion 5a in the regulating hole portion 3a when the valve member 5 opens and closes the valve seat 4 and the valve seat 4 is gradually opened and closed by the action of the throttle to thereby enhance controllability of a flow rate at a stage of a small opening degree of the valve member 5.

However, the structure in which the regulating shaft portion 5a in the shape of the cylindrical column is formed on the front face of the valve member 5 and is fitted in the regulating hole portion 3a formed at the end portion of the port hole 3 complicates the shape of the valve member 5, increases the weight of the valve member 5, and impairs workability and operability. Moreover, such also affects the flow rate characteristic when the valve member 5 fully opens the valve seat 4. In other words, the shape of the opening when the valve member 5 is fully open approximates a cylinder formed with an outside diameter D4 of the regulating shaft portion 5a, an inside diameter D5 of the regulating hole portion 3a, and a distance X from an end of the valve seat 4 or the regulating hole portion 3a to the regulating shaft portion 5a. Because both the regulating shaft portion 5a and the regulating hole portion 3a have smaller diameters than a seat diameter D6, the opening area of a flow path is subject to constraints by the regulating shaft portion 5a and the regulating hole portion 3a.

DISCLOSURE OF THE INVENTION

It is a technical object of the present invention to provide a vacuum pressure regulating valve having excellent controllability at a stage of a small opening degree of a valve member while having an excellent flow rate characteristic when the valve member has fully opened a valve seat and having a simple structure.

To achieve the above object, according to the invention, there is provided a vacuum pressure regulating valve comprising: a first main port and a second main port respectively connected to one of a vacuum pump and a vacuum chamber and the other; an annular valve seat formed in a connecting path connecting both the main ports; a circular flow path wall coaxially surrounding the valve seat and having a diameter greater than a seat diameter of the valve seat; a disc-shaped valve member which has a front face mounted with a first sealing member for opening and closing the valve seat and a circular outer peripheral wall having a diameter smaller than that of the flow path wall and greater than the seat diameter and which is fitted in the flow path wall to thereby form a restricted flow path between the flow path wall and the outer peripheral wall; and a driving portion for causing the valve member to carry out opening and closing operations.

In the pressure regulating valve of the invention having the above structure, the valve member is driven by the driving mechanism and the first sealing member is brought in contact with and separated from the valve seat to thereby open and close the valve seat. Here, when the valve member closes the valve seat from an open state, the flow path area first changes by a large amount. When the valve member approaches the valve seat and is fitted in the flow path wall, the flow path is throttled by the outer peripheral wall of the valve member and the flow path wall and the restricted flow path is formed of a clearance between the outer peripheral wall and the flow path wall. The flow path area of the restricted flow path is gradually reduced as the outer peripheral wall is fitted in the flow path wall and the first sealing member finally comes in contact with the valve seat to close the valve seat.

When the valve member opens the valve seat from a closed position, a valve opening operation starts from a state in which the valve member is fitted in the flow path wall to form the restricted flow path and the flow path area of the restricted flow path gradually increases. Then, when the valve member gets out of the flow path wall, the state of the restricted flow path is cancelled and therefore the flow path area rapidly increases and then the valve member reaches a fully open position.

As a result, the pressure regulating valve of the invention has excellent controllability at a stage of a small opening degree of the valve seat by the valve member because the restricted flow path is formed by the flow path wall formed around the valve seat and the outer peripheral wall of the valve member and the flow path area of the restricted flow path can gradually be changed. The shape of an opening when the valve member is fully open approximates a cylinder formed of an outside diameter of the outer peripheral wall, an inside diameter of the flow path wall, and a distance from an upper end of the flow path wall to the valve member. Because both the outside diameter of the outer peripheral wall and inside diameter of the flow path wall are greater than the seat diameter of the valve seat, the flow path area in terms of valve opening does not suffer constraints by the valve member and the flow path wall and the flow rate characteristic in the valve opening is excellent. Moreover, because there is no need to form a prior-art regulating shaft portion on the front face of the valve member, the valve member can be formed with a simple and lightweight shape and the workability and operability thereof are excellent.

In the invention, the valve member does not have a projecting portion or member which is fitted in the valve seat to affect change in a flow path area on the front face of the valve member.

In the invention, the height of the flow path wall and height of the outer peripheral wall of the valve member preferably approximate each other. At least one of the outer peripheral wall of the valve member and the flow path wall may be tapered.

In the invention, a plurality of notches for regulating the flow path area of the restricted flow path is preferably provided on one of the outer peripheral wall of the valve member and the flow path wall. The notches may be grooves provided on the outer peripheral wall of the valve member or the flow path wall in a longitudinal direction of the wall or may be holes formed in a cylindrical member forming the flow path wall.

According to a preferred structural aspect of the invention, one of the outer peripheral walls of the valve member and the flow path wall not provided with the notches is provided with a second sealing member for coming in contact with the other wall to thereby control the flow path area of the restricted flow path together with the notches.

According to another concrete structural aspect of the invention, the flow path wall is formed of a cylindrical member mounted around the valve seat, the valve member has a circular outer ring portion surrounding the outer peripheral wall with a constant space between the outer peripheral wall and the outer ring portion, and the flow path wall is fitted between the outer peripheral wall and the outer ring portion when the valve member approaches the valve seat to thereby form the bent restricted flow path between the outer peripheral wall, the outer ring portion, and the flow path wall.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION

Figure 1:
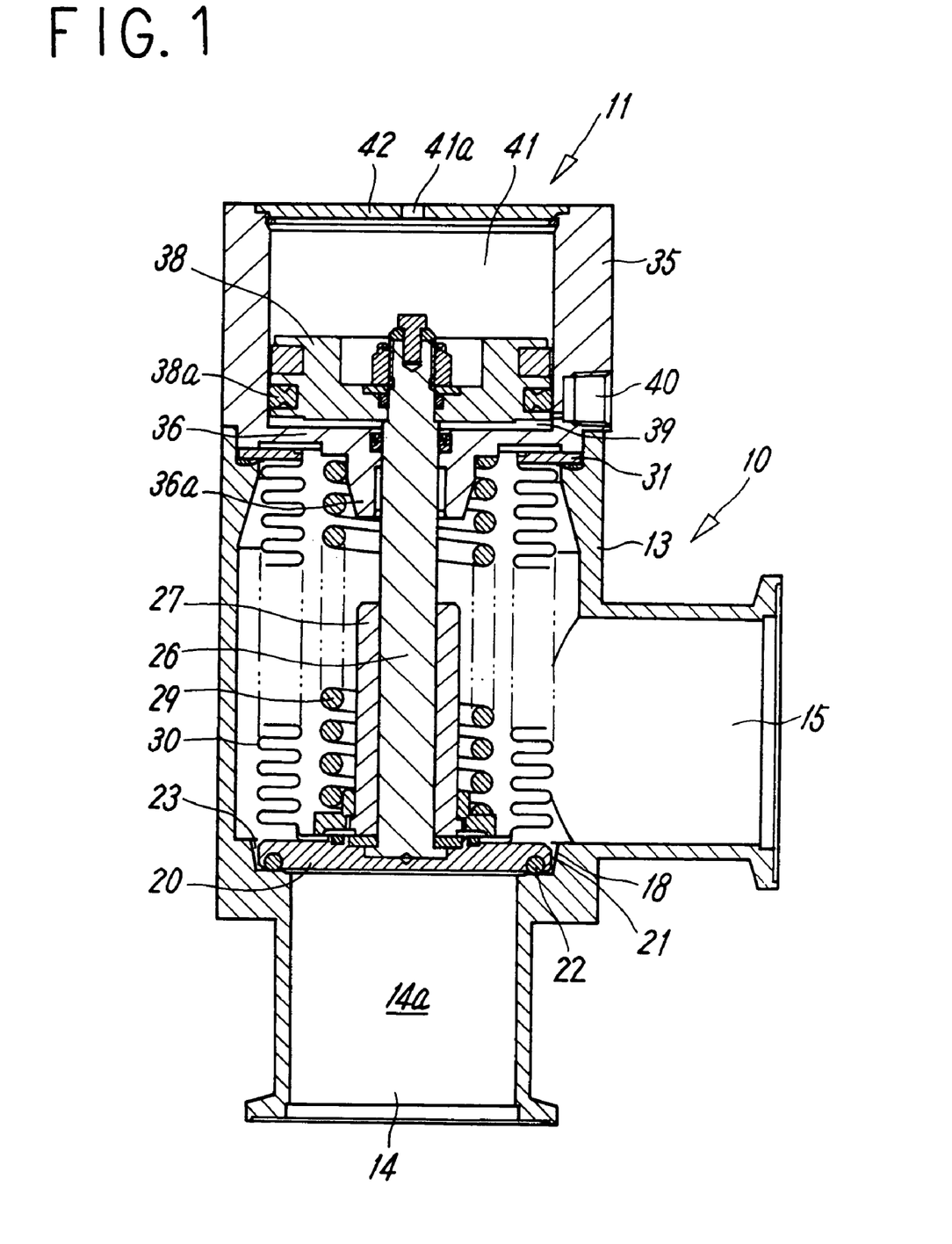
FIG. 1 is a sectional view of a first embodiment of a vacuum pressure regulating valve according to the present invention in a closed state of the valve.
Figure 2:
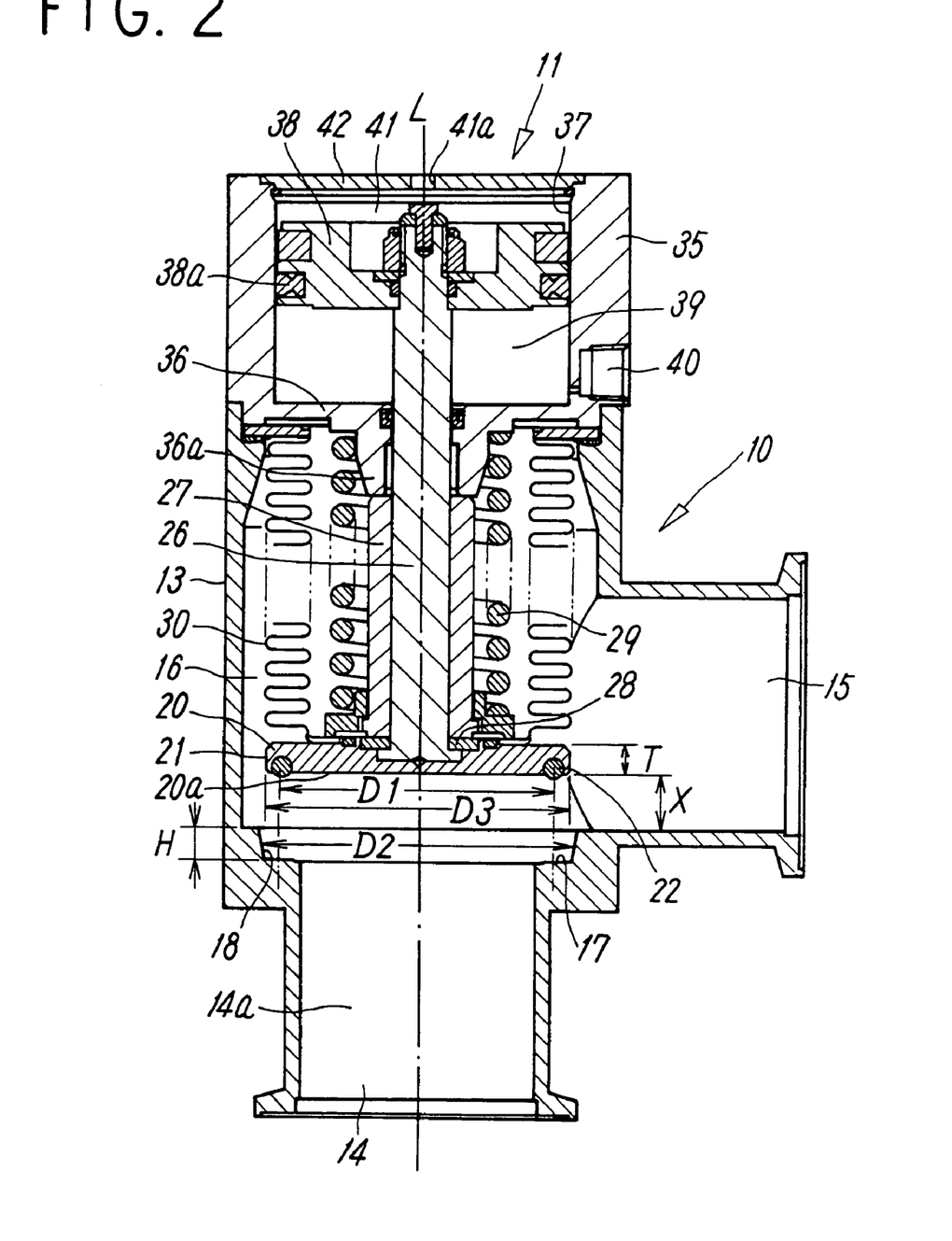
FIG. 2 is a sectional view of an open state of the valve in FIG. 1.

FIGS. 1 and 2 show a first embodiment of a vacuum pressure regulating valve according to the invention. This valve is suitable to use in reducing pressure in a vacuum chamber in a producing apparatus of a semiconductor and includes a valve opening/closing portion 10 formed such that a fluid flow path is opened and closed by a valve member 20 and a driving portion 11 for driving the valve member 20.

The valve opening/closing portion 10 has a housing 13 made of metallic material such as stainless steel (SUS) and is in the shape of a cylindrical column or a square pole. The housing 13 has a first main port 14 to be connected to one of the vacuum chamber and a vacuum pump, a second main port 15 to be connected to the other, a connecting path 16 connecting both the main ports 14 and 15, and an annular valve seat 17 provided in the connecting path 16. The first main port 14 is formed in a coaxial position with an axis L of the housing 13 and the second main port 15 is formed in an orientation at 90° from the first main port 14.

The valve seat 17 is formed at a position on an inner end side of a port hole 14a of the first main port 14 so as to surround the port hole 14a and a circular flow path wall 18 surrounding the valve seat 17 is formed integrally with the housing 13 around the valve seat 17. This flow path wall 18 is provided coaxially with the valve seat 17 and rises to a certain height in a direction of the axis L and a height H of the flow path wall 18 approximates to a thickness T of the disc-shaped valve member 20. The flow path wall 18 is inclined by being tapered so that a diameter of the flow path wall 18 increases upward. As a result, the diameter D2 of the flow path wall 18 is smaller on a lower end portion side near the valve seat 17 and is larger on an upper end portion side near the connecting path 16. Moreover, the smallest diameter of the flow path wall 18 on its lower end portion side is still greater than a seat diameter D1 of the valve seat 17.

Inside the housing 13, the poppet-type valve member 20 for opening and closing the valve seat 17 is provided coaxially with the valve seat 17 in the connecting path 16. This valve member 20 is in a disc shape and has a substantially flat front face 20a and a circular outer peripheral wall 21 and an annular rubber first sealing member 22 for coming in contact with and separating from the valve seat 17 is mounted in a position close to an outer peripheral edge of the front face 20a. The front face 20a is not provided with a portion or a member projecting further forward than the first sealing member 22 from the front face 20a, i.e., a projecting portion or a projecting member which would be fitted in the port hole 14a inside the valve seat 17 to affect change in a flow path area. The diameter D3 of the outer peripheral wall 21 is uniform throughout a total length of the outer peripheral wall 21, i.e., a total thickness of the valve member 20 and is slightly smaller than the diameter of the lower end side of the inclined flow path wall 18.

In the example shown in the drawings, the valve member 20 has a substantially uniform thickness which is substantially equal to a height of the outer peripheral wall 21 and therefore the height of the outer peripheral wall 21 approximates to the height H of the flow path wall 18. However, the thickness of the valve member 20 is not necessarily uniform but the valve member 20 may partially project on a back face side. The height of the outer peripheral wall 21 may be slightly smaller or larger than the height H of the flow path wall 18.

As shown in FIG. 1, if the valve member 20 is fitted in the flow path wall 18, a clearance 23 is formed between the outer peripheral wall 21 of the valve member 20 and the flow path wall 18 and a restricted flow path with a throttled area is formed of the clearance 23. In other words, the outer peripheral wall 21 of the valve member 20 and the flow path wall 18 form a throttle. The area of the restricted flow path formed of the clearance 23 changes according to a degree of fitting of the outer peripheral wall 21 and the flow path wall 18 with each other. The smaller the fitting degree, the larger the area becomes. The area gradually reduces as the fitting degree increases. Therefore, the throttle formed of the outer peripheral wall 21 and the flow path wall 18 is a variable throttle in which the flow path area varies depending on an operating position of the valve member 20.

A tip end portion of a driving rod 26 is mounted to a central position of the back face of the valve member 20. The rod 26 extends along the axis L in the housing 13 and a base end portion of the rod 26 reaches a position of the driving portion 11 and then passes through a partition 36 defining the valve opening/closing portion 10 and the driving portion 11 and is coupled to the piston 38. The rod 26 is moved forward and rearward by the piston 38 to thereby open and close the valve seat 17 with the valve member 20.

A cylindrical stopper 27 for determining a fully open position of the valve member 20 is fixed around rod 26. The stopper 27 extends a certain distance from the back face of the valve member 20 along the rod 26 and an end portion of the stopper 27 comes in contact with a contact portion 36a of the partition 36 in the fully open position of the valve member 20. A spring seat 28 is provided to the back face of the valve member 20 and a coil-shaped return spring 29 for elastically pushing the valve member 20 in a closing direction is provided between the spring seat 28 and the partition 36. A bellows 30 for expanding and contracting is provided to the back face of the valve member 20 so as to surround the rod 26, the stopper 27, and the return spring 29. One end of the bellows 30 is mounted to the back face of the valve member 20, the other end is mounted to a support plate 31 provided between an end portion of the housing 13 and the partition 36, and the bellows 30 expands and contracts as the valve member 20 opens and closes.

The driving portion 11 is formed of an air cylinder mechanism and has a cylinder body 35 coaxially coupled to an end of the housing 13. The cylinder body 35 is in a shape of the cylindrical column or the square pole similarly to the housing 13 and has the partition 36 between the housing 13 and the cylinder body 35 on one end side of the cylinder body 35 in the axial direction and a cylinder bore 37 inside the cylinder body 35 and the piston 38 is housed for sliding in the cylinder bore 37 through a sealing member 38a. The rod 26 passes through the partition 36 for sliding and extends into the cylinder bore 37 and the base end portion of the rod 26 is coupled to the piston 38.

On one side of the piston 38, a pressure chamber 39 defined by the piston 38 and the partition 36 is formed and is connected to an operating port 40 open in a side face of the cylinder body 35. On the other side of the piston 38, a breathing chamber 41 defined by a lid plate 42 mounted to the cylinder body 35 and the piston 38 is formed and is open to an outside through a breathing hole 41a formed in the lid plate 42 or the cylinder body 35.

Therefore, as shown in FIG. 1, if the pressure chamber 39 is opened to the outside through the operating port 40, the valve member 20 is moved forward by a force of the return spring 29 and the first sealing member 22 comes in contact with the valve seat 17 to close the valve seat 17. In this state, the vacuum pump and the vacuum chamber connected to both the main ports 14 and 15 are disconnected from each other.

As shown in FIG. 2, if compressed air is supplied from the operating port 40 into the pressure chamber 39, the piston 38 moves rearward to move the valve member 20 rearward through the rod 26. As a result, the first sealing member 22 of the valve member 20 separates from the valve seat 17 to open the valve seat 17. The valve member 20 stops in the fully open position where the stopper 27 comes in contact with the contact portion 36a of the partition 36.

Here, in a case in which the valve member 20 moves from the open position in FIG. 2 to the closed position in FIG. 1, the flow path area increases as the valve member 20 moves at an initial stage of operation until the time immediately before the valve member 20 approaches the valve seat 17 and is fitted in the flow path wall 18. Then, when the valve member 20 is fitted in the flow path wall 18, the flow path is throttled by the outer peripheral wall 21 of the valve member 20 and the flow path wall 18 to create the restricted flow path formed of the clearance 23. The flow path area of the restricted flow path is gradually throttled as the outer peripheral wall 21 is fitted in the flow path wall 18 and finally the first sealing member 22 comes in contact with the valve seat 17 to close the valve seat 17.

When the valve member 20 opens the valve seat 17 from the closed position, the flow path area of the fluid flow path gradually increases from the state of the restricted flow path because a valve opening operation starts from the state in which the valve member 20 is fitted in the flow path wall 18. Then, if the valve member 20 gets out of the flow path wall 18, the state of the restricted flow path is cancelled and therefore the flow path area rapidly increases and then the valve member 20 reaches the fully open position.

Thus, the regulating valve has excellent controllability of a flow rate at the stage of the small opening degree of the valve seat 17, e.g., at the initial stage of valve opening or immediately before valve closing ends, because the restricted flow path is formed by the flow path wall 18 around the valve seat 17 and the outer peripheral wall 21 of the valve member 20 and the flow path area of the restricted flow path gradually changes when the opening degree of the valve seat 17 by the valve member 20 is small. The shape of the opening portion when the valve member 20 is in the fully open position approximates a cylinder formed of the diameter D3 of the outer peripheral wall 21, the diameter D2 of the flow path wall 18, and a distance X from an upper end of the flow path wall 18 to the valve member 20. However, because both the diameters D3 and D2 are greater than the seat diameter D1 of the valve seat 17, the flow path area in valve opening does not suffer constraints by the valve member 20 and the flow path wall 18 and the flow rate characteristic in valve opening is excellent. Moreover, because there is no need to form the prior-art regulating shaft portion on the front face 20a of the valve member 20, the valve member 20 can be formed with a simple and light-weight shape and the workability and operability thereof are excellent.

Although the flow path wall 18 is tapered and the outer peripheral wall 21 has the uniform diameter in the example shown in the drawing, it is also possible that the outer peripheral wall 21 is tapered and that the flow path wall 18 has a uniform diameter on the contrary.

Figure 3:
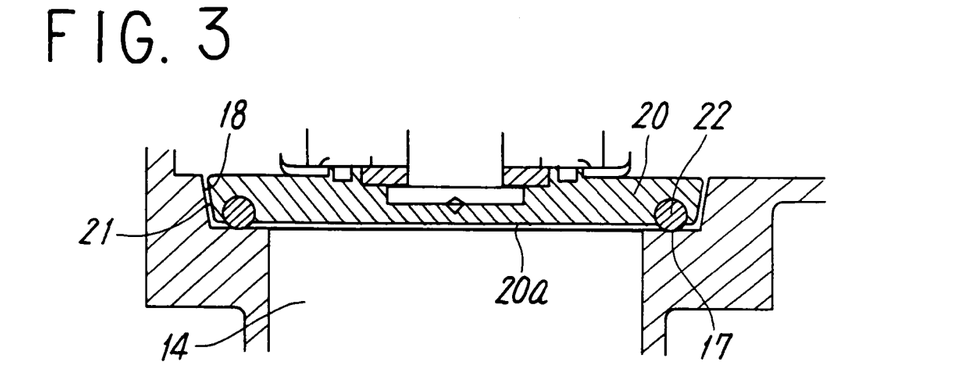
FIG. 3 is a sectional view of an essential portion of a second embodiment of the invention.

FIG. 3 shows an essential portion of the second embodiment of the invention. In a valve of the second embodiment, both the outer peripheral wall 21 of the valve member 20 and the flow path wall 18 are tapered in the same direction. Therefore, the outer peripheral wall 21 is inclined so that its diameter gradually reduces toward the front face 20a of the valve member 20. By tapering both the outer peripheral wall 21 and flow path wall 18 in this manner, it is possible to obtain a different changing characteristic of the flow path area of the restricted flow path from the case in which only one of the outer peripheral wall 21 and the flow path wall 18 is tapered.

Structures for the valve of the second embodiment other than those described above are substantially similar to those of the first embodiment. This holds true for the third and the following embodiments which will be described below.

Figure 4:
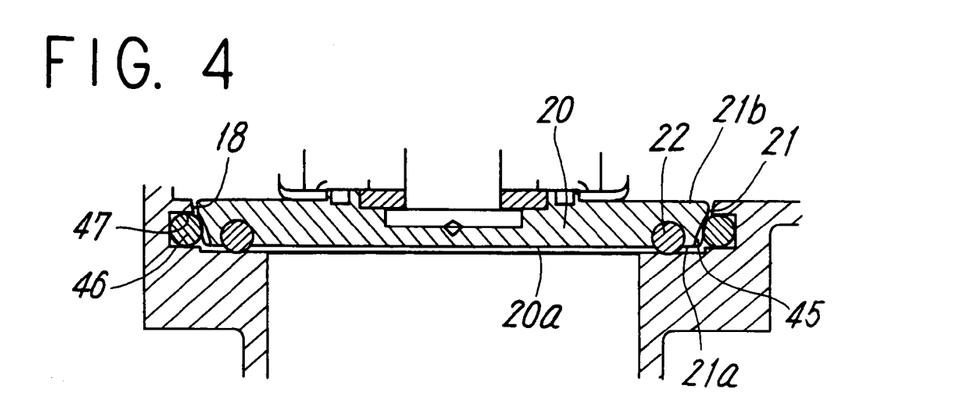
FIG. 4 is a sectional view of an essential portion of a third embodiment of the invention.
Figure 5:
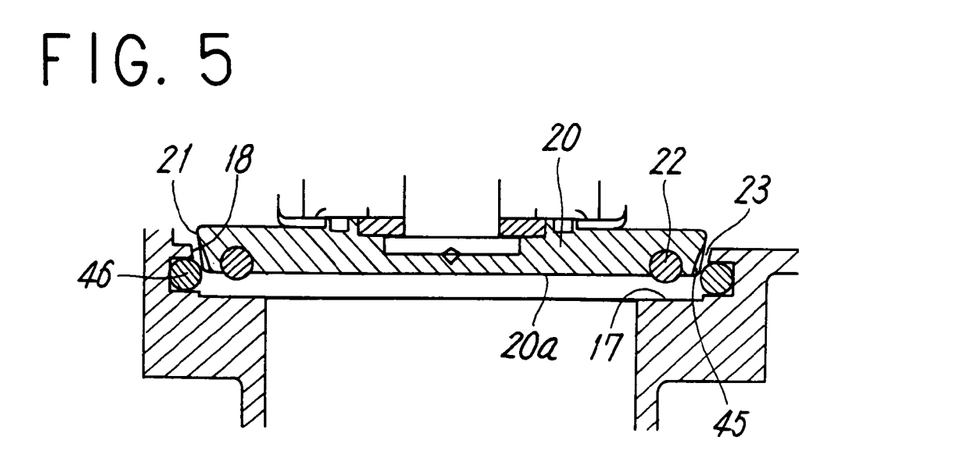
FIG. 5 is a sectional view of a different operation state of the third embodiment.

FIGS. 4 and 5 show essential portions of the third embodiment of the invention. In a valve of the third embodiment, both the outer peripheral wall 21 of the valve member 20 and the flow path wall 18 are tapered in the same direction, a plurality of notches 45 for regulating a flow path area and forming a portion of a restricted flow path formed between both the walls 18 and 21 are provided on the outer peripheral wall 21, and a second sealing member 46 for coming in contact with the outer peripheral wall 21 is mounted in a recessed groove 47 formed in the flow path wall 18 which is not provided with such notches 45.

Figure 8:
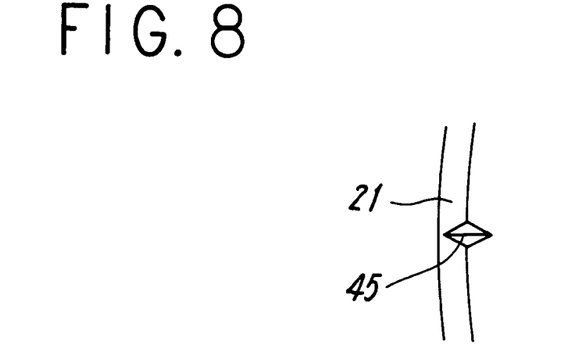
FIG. 8 is a partial bottom view of a valve member and showing an example of a shape of a notch in FIGS. 6 and 7.
Figure 9:
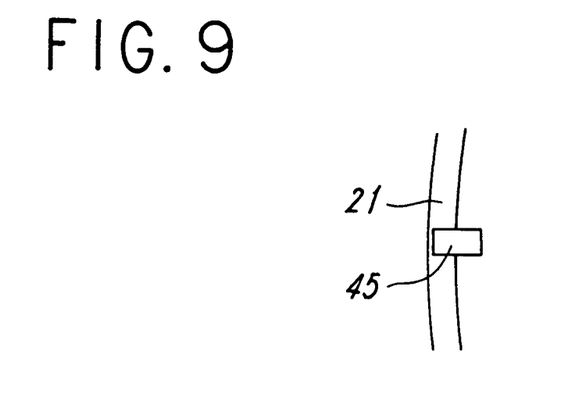
FIG. 9 is a partial bottom view of the valve member and showing another example of the shape of the notch.
Figure 10:
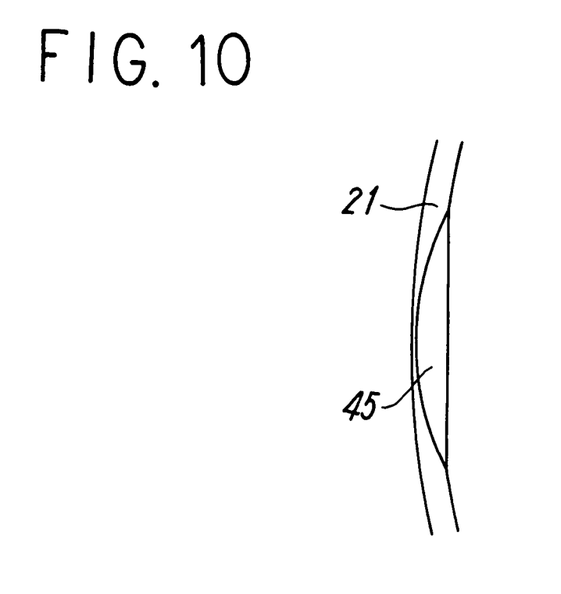
FIG. 10 is a partial bottom view of the valve member and showing yet another example of the shape of the notch.
Figure 11:
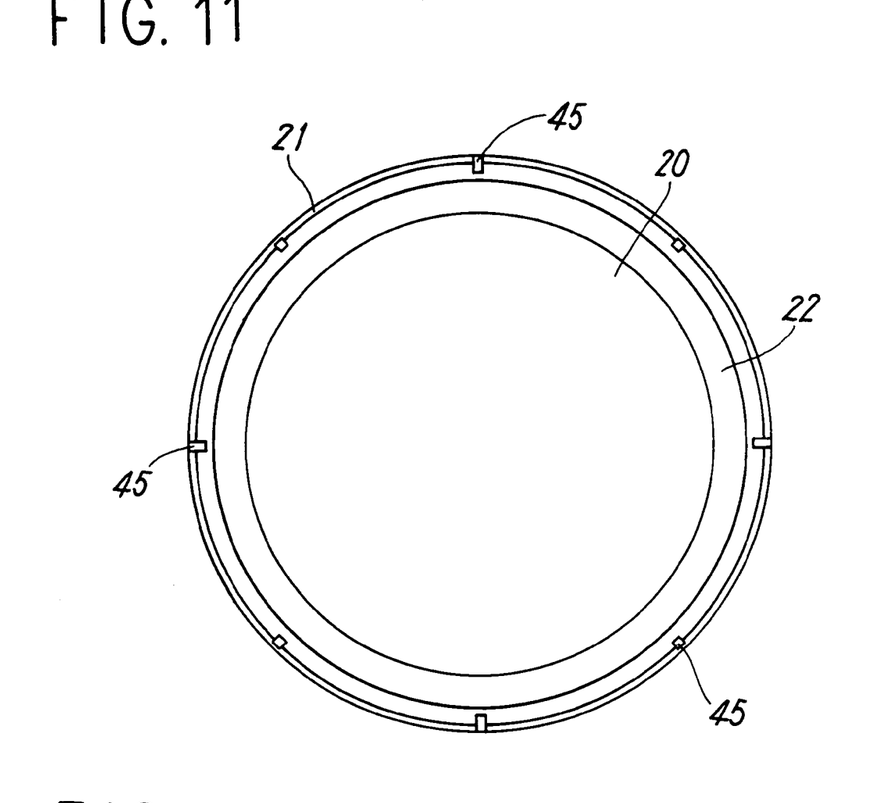
FIG. 11 is a bottom view of the valve member and showing an example of a form of formation of the notches.

Each notch 45 is formed with a groove extending in an axial direction of the valve member 20 and may be in a V shape as shown in FIG. 8, a shape having a flat bottom as shown in FIG. 9, a chamfered shape obtained by linearly cutting a portion of a circumference as shown in FIG. 10, or other shapes. The plurality of notches 45 is formed at regular intervals along the circumference of the outer peripheral wall 21 as shown in FIG. 11. In this case, all of the plurality of notches 45 may have the same shapes or notches with different shapes may be mixed.

Each notch 45 is formed not throughout a length of the outer peripheral wall 21 from the axial front end 21a to the rear end 21b but is instead formed locally in a portion from the front end 21a to some midpoint of the outer peripheral wall 21. Moreover, the depth of the notch 45 is greater on the front end 21a side of the outer peripheral wall 21 and gradually reduces toward the rear end 21b side.

In the third embodiment, if the valve member 20 approaches the valve seat 17 and is fitted in the flow path wall 18, the restricted flow path is formed of the clearance 23 between the outer peripheral wall 21 of the valve member 20 and the flow path wall 18. Then, if the valve member 20 further moves and the degree of fitting of the valve member 20 with the flow path wall 18 increases, the valve member 20 comes in contact with the second sealing member 46 as shown in FIG. 4 and, as a result, the clearance 23 is closed and the restricted flow path is now formed by the plurality of notches 45 only and is further throttled. If the valve member 20 further moves in this state, the area of the restricted flow path further reduces because the depth of each the notch 45 is gradually reducing. In a position in FIG. 5 where the first sealing member 22 comes in contact with the valve seat 17, the valve is closed.

Figure 6:
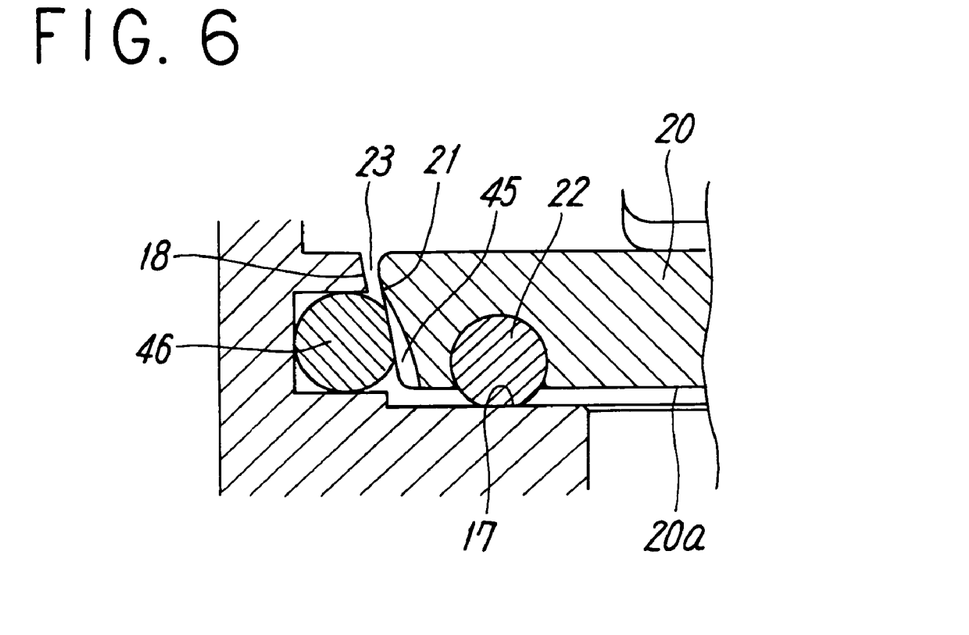
FIG. 6 is an enlarged view of an essential portion of FIG. 5.
Figure 7:
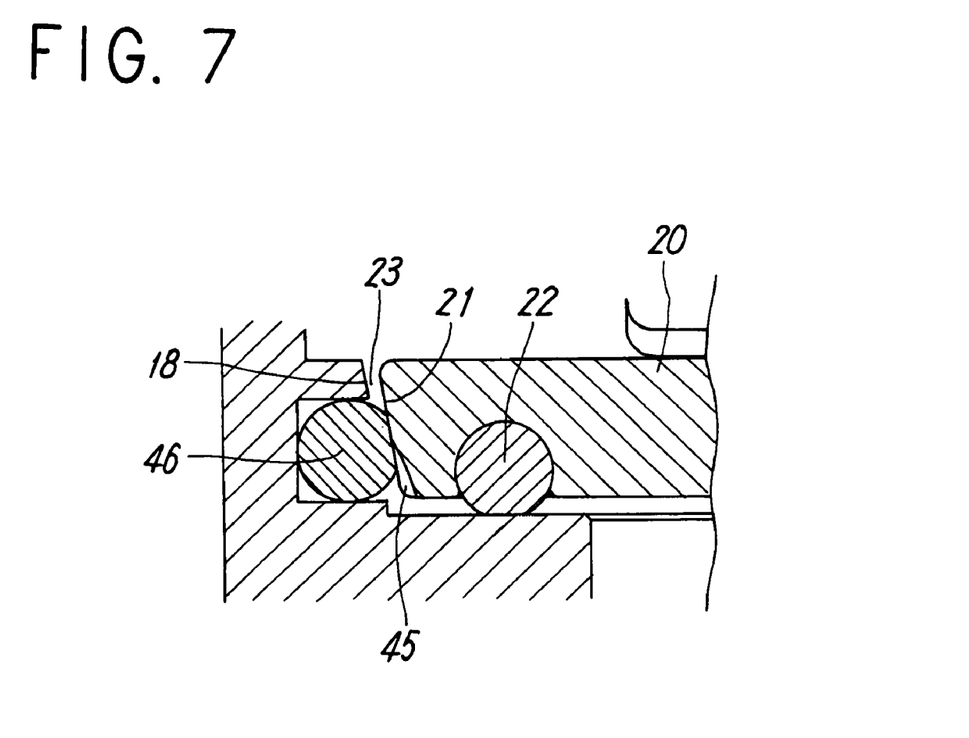
FIG. 7 is an enlarged view of an essential portion and showing a variation of FIG. 6.

Here, by forming the second seal member 46 so that it comes in contact with the outer peripheral wall 21 of the valve member 20 in a position over the notches 45 as shown in FIG. 6 when the valve member 20 closes the valve seat 17, the restricted flow path is maintained in a slightly open state. On the other hand, by forming the second sealing member 46 so that it comes in contact with the outer peripheral wall 21 of the valve member 20 in a position substantially deviated from the notches 45 as shown in FIG. 7, the restricted flow path is completely closed.

It is also possible to form the notches 45 on the flow path wall 18 and to from the second sealing member 46 on the outer peripheral wall 21 of the valve member 20.

Each notch 45 may be formed throughout the outer peripheral wall 21 or the flow path wall 18 from the front end side to the rear end side. In this case, the notch 45 may have a uniform depth or a gradually changing depth.

Figure 12:
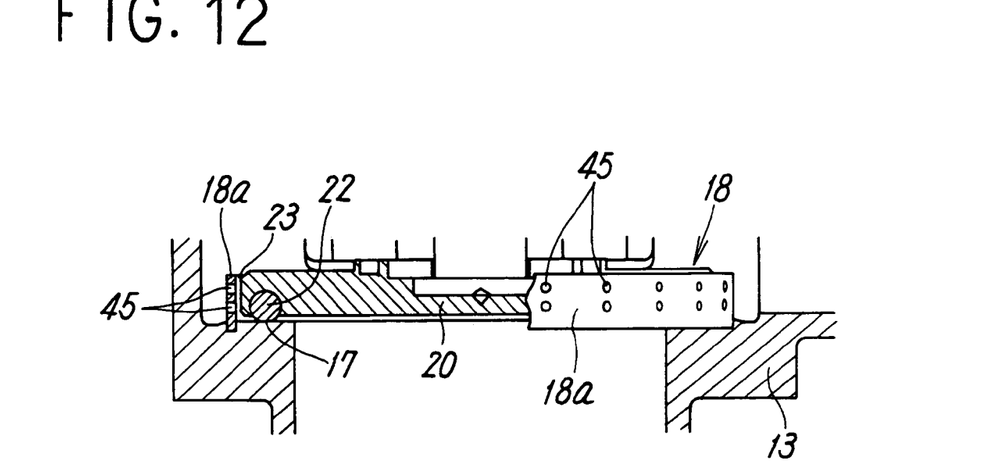
FIG. 12 is a sectional view of an essential portion of the fourth embodiment of the invention.

FIG. 12 shows an essential portion of the fourth embodiment of the invention. In a valve of the fourth embodiment, the flow path wall 18 is formed of a cylindrical member 18a separate from the housing 13, the cylindrical member 18a is fixed coaxially around the valve seat 17, and the plurality of notches 45 are formed on the cylindrical member 18a. The notches 45 are formed of circular holes and the plurality of notches, i.e., holes 45 are provided in each of a plurality of positions to be formed with the holes and provided at regular intervals in a circumferential direction of the cylindrical member 18a. Although two holes 45 are provided at a regular interval in an axial direction of the cylindrical member 18a in each the position to be formed with the holes in the example shown in the drawings, three ore more holes 45 may be provided.

In the fourth embodiment, a restricted flow path formed of the clearance 23 and the holes 45 is formed between the outer peripheral wall 21 of the valve member 20 and the flow path wall 18 when the valve member 20 moves in the flow path wall 18.

Figure 13:
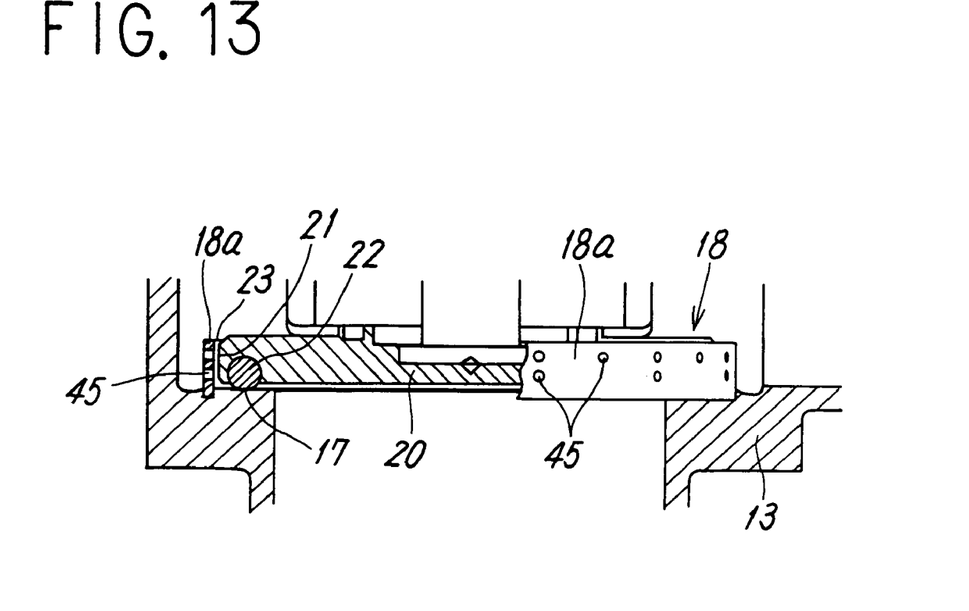
FIG. 13 is a sectional view of an essential portion of the fifth embodiment of the invention.

FIG. 13 shows an essential portion of the fifth embodiment of the invention and the fifth embodiment is different from the above fourth embodiment in that two holes and one hole as the notches 45 are alternately formed in the positions to be formed with (a) hole(s) of the cylindrical member 18a forming the flow path wall 18. In this case, in the position where the one notch, i.e., hole 45 is provided, the lower hole is omitted.

Figure 14:
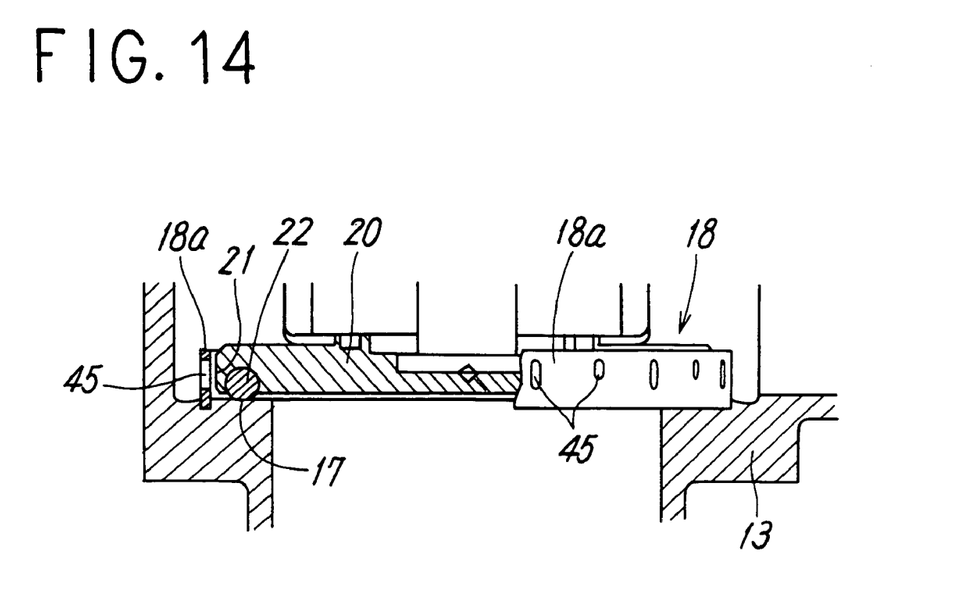
FIG. 14 is a sectional view of an essential portion of the sixth embodiment of the invention.

FIG. 14 shows an essential portion of the sixth embodiment of the invention. The sixth embodiment is different from the above-noted fourth and fifth embodiments in that the hole forming each the notch 45 is not of a circular shape but of a shape of a narrow and elongated hole which is long in the axial direction of the flow path wall 18. In this case, all the holes 45 may have the same lengths or long elongated holes 45 and short elongated holes 45 may be provided alternately as shown in the drawing.

In the fourth to sixth embodiments, it is also possible that at least one of the outer peripheral wall 21 of the valve member 20 and the flow path wall 18 is inclined by being tapered.

Figure 15:
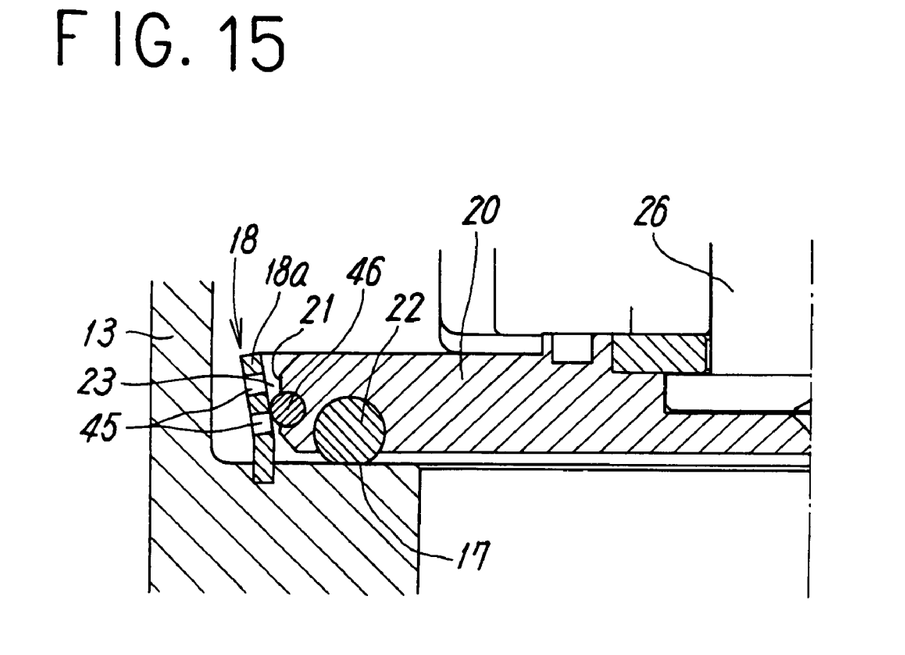
FIG. 15 is a sectional view of an essential portion of the seventh embodiment of the invention.

FIG. 15 shows an essential portion of the seventh embodiment of the invention. The seventh embodiment is different from the above fourth to sixth embodiments in that the cylindrical member 18a forming the flow path wall 18 is tapered and inclined with its diameter increasing upward and that the second sealing member 46 is mounted to the outer peripheral wall 21 of the valve member 20. In this case, the notches 45 formed on the cylindrical member 18a may be circular holes or elongated holes. If the circular holes are provided, two holes may be provided to each the position to be formed with holes as shown in FIG. 12 or two holes and one hole may be provided alternately in the positions to be formed with (a) hole(s) as show in FIG. 13. If the elongated holes are provided, the elongated holes having the same lengths may be provided in the respective positions to be formed with the hole or the long elongated holes and short elongated holes may be provided alternately as shown in FIG. 14.

In the seventh embodiment, when the valve member 20 is fitted in the flow path wall 18, a restricted flow path is formed of the clearance 23 between the outer peripheral wall 21 and the flow path wall 18 and a flow path area reduces as a fitting degree of the valve member 20 increases. Then, the second sealing member 46 comes in contact with the flow path wall 18 around the time immediately before the first sealing member 22 comes in contact with the valve seat 17. By changing settings such as shapes, the number, and arrangement of the notches 45, the restricted flow path may be slightly open through a part of the notches 45 as shown in FIG. 15 or may completely be closed when the valve is closed.

Figure 16:
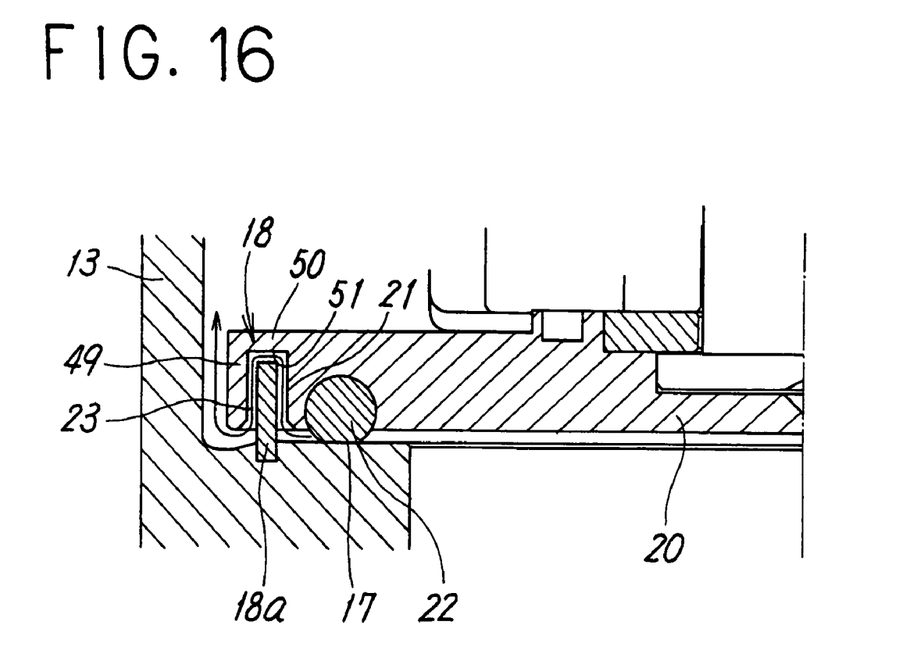
FIG. 16 is a sectional view of an essential portion of the eighth embodiment of the invention.

FIG. 16 shows an essential portion of the eighth embodiment of the invention. In a valve of the eighth embodiment, the flow path wall 18 is formed of the cylindrical member 18a having a uniform diameter and the cylindrical member 18a is coaxially mounted around the valve seat 17. Furthermore, the valve member 20 has the outer peripheral wall 21 having the uniform diameter and a circular outer ring portion 49 surrounding the outer peripheral wall 21 with a constant space between them. An upper end portion of the outer ring portion 49 and an upper end portion of the outer peripheral wall 21 are integrally connected to each other through a connecting portion 50. Therefore, between the outer peripheral wall 21 and the outer ring portion 49, an annular space 51 having a depth slightly greater than a height of the flow path wall 18 is formed.

If the valve member 20 approaches the valve seat 17 in valve closing operation, the flow path wall 18 is fitted in the space 51 and a restricted flow path formed of the bent clearance 23 is formed between the outer peripheral wall 21, the outer ring portion 49, and the flow path wall 18.

As described above, according to the invention, it is possible to obtain the vacuum pressure regulating valve with the excellent controllability at the stage of the small opening degree of the valve member, the excellent flow path characteristic when the valve member fully opens the valve seat, and the simple structure.

The invention claimed is:

1. A vacuum pressure regulating valve comprising:
   a first main port and a second main port respectively connected to one of a vacuum pump and a vacuum chamber and the other;
   an annular valve seat formed in a connecting path connecting both of said main ports;
   a circular flow path wall coaxially surrounding the valve seat and having a diameter greater than a seat diameter of the valve seat;
   a disc-shaped valve member which has a front face mounted with a first sealing member for opening and closing the valve seat and a circular outer peripheral wall having a diameter smaller than that of the flow path wall and greater than the seat diameter and which is fitted in the flow path wall to thereby form a restricted flow path between the flow path wall and the outer peripheral wall; and
   a driving portion for causing the valve member to carry out opening and closing operations wherein a height of the flow path wall and a height of the outer peripheral wall of the valve member approximate each other.

2. A pressure regulating valve according to claim 1, wherein the valve member does not have a projecting portion or member which is fitted in the valve seat to affect change in a flow path area on the front face of the valve member.

3. A pressure regulating valve according to claim 1, wherein at least one of the outer peripheral wall of the valve member and the flow path wall is tapered.

4. A pressure regulating valve according to claim 1, wherein a plurality of notches for regulating the flow path area of the restricted flow path are provided in one of the outer peripheral wall of the valve member and the flow path wall.

5. A pressure regulating valve according to claim 2, wherein a plurality of notches for regulating the flow path area of the restricted flow path are provided on one of the outer peripheral wall of the valve member and the flow path wall.

6. A pressure regulating valve according to claim 3, wherein a plurality of notches for regulating the flow path area of the restricted flow path are provided on one of the outer peripheral wall of the valve member and the flow path wall.

7. A pressure regulating valve according to claim 4, wherein one of the outer peripheral wall of the valve member and the flow path wall not provided with the notches is provided with a second sealing member for coming in contact with the other wall provided with the notches to thereby control the flow path area of the restricted flow path together with the notches.

8. A pressure regulating valve according to claim 5, wherein one of the outer peripheral wall of the valve member and the flow path wall not provided with the notches is provided with a second sealing member for coming in contact with the other wall provided with the notches to thereby control the flow path area of the restricted flow path together with the notches.

9. A pressure regulating valve according to claim 6, wherein one of the outer peripheral wall of the valve member and the flow path wall not provided with the notches is provided with a second sealing member for coming in contact with the other wall provided with the notches to thereby control the flow path area of the restricted flow path together with the notches.

10. A pressure regulating valve according to claim 4, wherein the notches comprise grooves provided on the flow path wall or the outer peripheral wall in a height direction of the wall.

11. A pressure regulating valve according to claim 5, wherein the notches are grooves provided on the flow path wall or the outer peripheral wall in a height direction of the wall.

12. A pressure regulating valve according to claim 6, wherein the notches are grooves provided on the flow path wall or the outer peripheral wall in a height direction of the wall.

13. A pressure regulating valve according to claim 4, wherein the flow path wall is formed of a cylindrical member provided around the valve seat and the notches are formed of holes formed in the cylindrical member.

14. A pressure regulating valve according to claim 5, wherein the flow path wall is formed of a cylindrical member provided around the valve seat and the notches are formed of holes formed in the cylindrical member.

15. A pressure regulating valve according to claim 6, wherein the flow path wall is formed of a cylindrical member provided around the valve seat and the notches are formed of holes formed in the cylindrical member.

* * * * *